United States Patent [19]
Scott

[11] Patent Number: 6,042,497
[45] Date of Patent: Mar. 28, 2000

[54] VARIABLE SPEED TRANSMISSION

[76] Inventor: Larry T. Scott, HC33, Box 922, Petersburg, W. Va. 26847

[21] Appl. No.: 08/965,284

[22] Filed: Nov. 6, 1997

[51] Int. Cl.[7] .................................................. F16H 48/06
[52] U.S. Cl. .......................... 475/204; 475/221; 475/226; 475/218
[58] Field of Search .................................... 475/226, 227, 475/204, 218, 219, 221

[56] References Cited

U.S. PATENT DOCUMENTS

| | | | |
|---|---|---|---|
| Re. 33,278 | 7/1990 | Johnshoy | 475/6 |
| 1,310,976 | 7/1919 | Williams | 475/227 |
| 2,070,569 | 2/1937 | Asam | 475/226 |
| 2,666,343 | 1/1954 | Casa-Massa | 475/227 |
| 3,651,712 | 3/1972 | Davis | 475/75 X |
| 4,519,272 | 5/1985 | Meier | 475/221 X |
| 4,762,022 | 8/1988 | Johnshoy | 475/221 |
| 4,784,017 | 11/1988 | Johnshoy | 475/7 X |
| 4,867,012 | 9/1989 | McGarraugh . | |
| 5,232,415 | 8/1993 | Brewer et al. | 475/227 |
| 5,474,504 | 12/1995 | Bay et al. . | |
| 5,516,132 | 5/1996 | Simkins . | |
| 5,540,632 | 7/1996 | Lardy et al. . | |

*Primary Examiner*—Charles A. Marmor
*Assistant Examiner*—Scott Lund
*Attorney, Agent, or Firm*—William L. Feeney; Kerkam, Stowell, Kondracki & Clarke, P.C.

[57] ABSTRACT

A mechanical assembly is operable as a variable speed transmission. The output shaft has a rotational force at speeds variable from an input applied to an input shaft. The mechanical assembly is a transmission device using a "positive traction" effect with a differential using a speed control (control shaft or hydraulic device) of relatively small controlling power to control transmission of power from the input shaft to the output shaft. Planetary gearing at a two-to-one ratio is used to convert the speed and direction supplied by the speed control to the output axle. The power input is applied to a differential carrier by a shaft mounted opposite of and collinear to the output axle. This eliminates the ring gear and pinion normally required. The carrier of a planetary gearing is used for speed control and is connected to the control shaft by a one-to-one ratio. The control shaft rotates in direct proportion to the output shaft and the output shaft maintains the same relative position of rotation as the control shaft. The speed of the output shaft can be varied or held at any speed from zero to the speed of the input power supply.

20 Claims, 6 Drawing Sheets

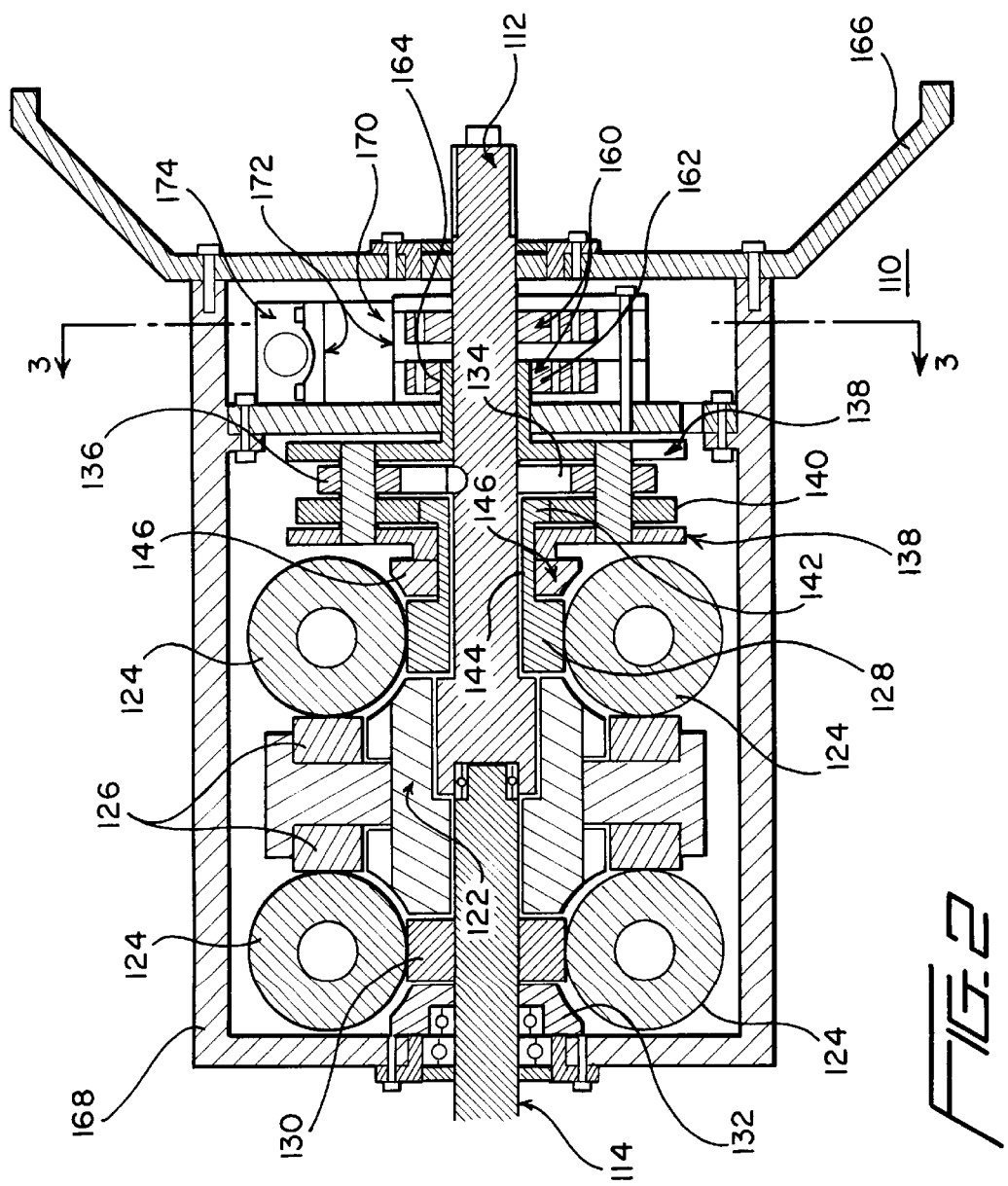

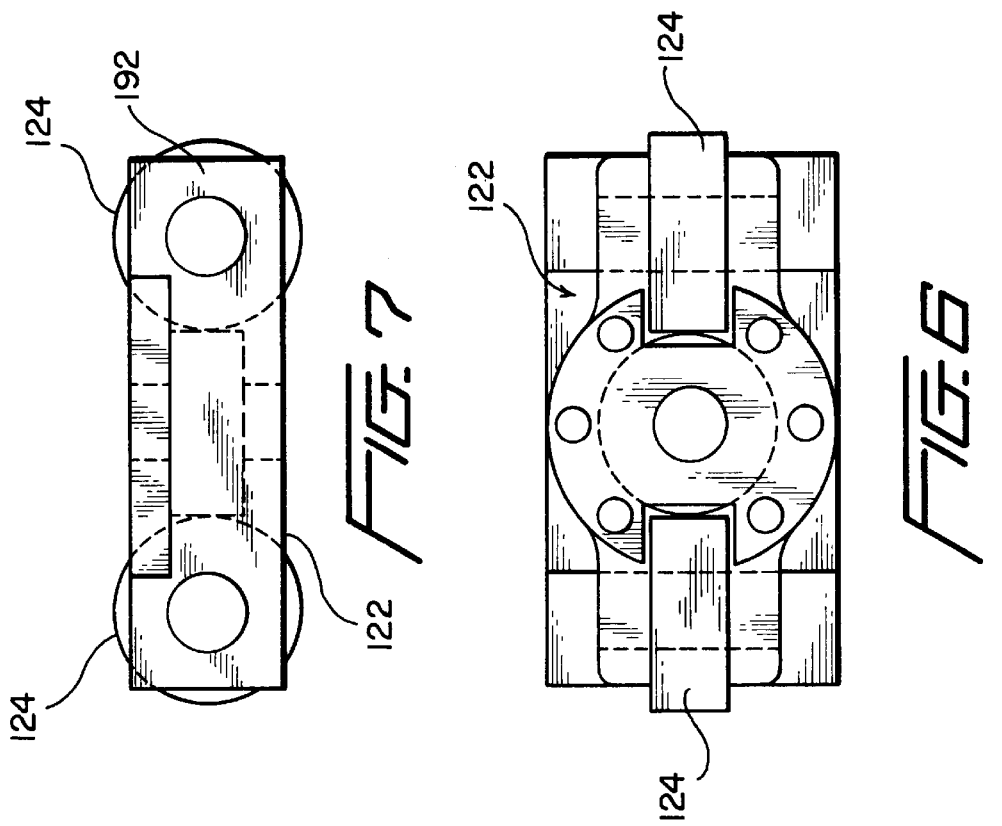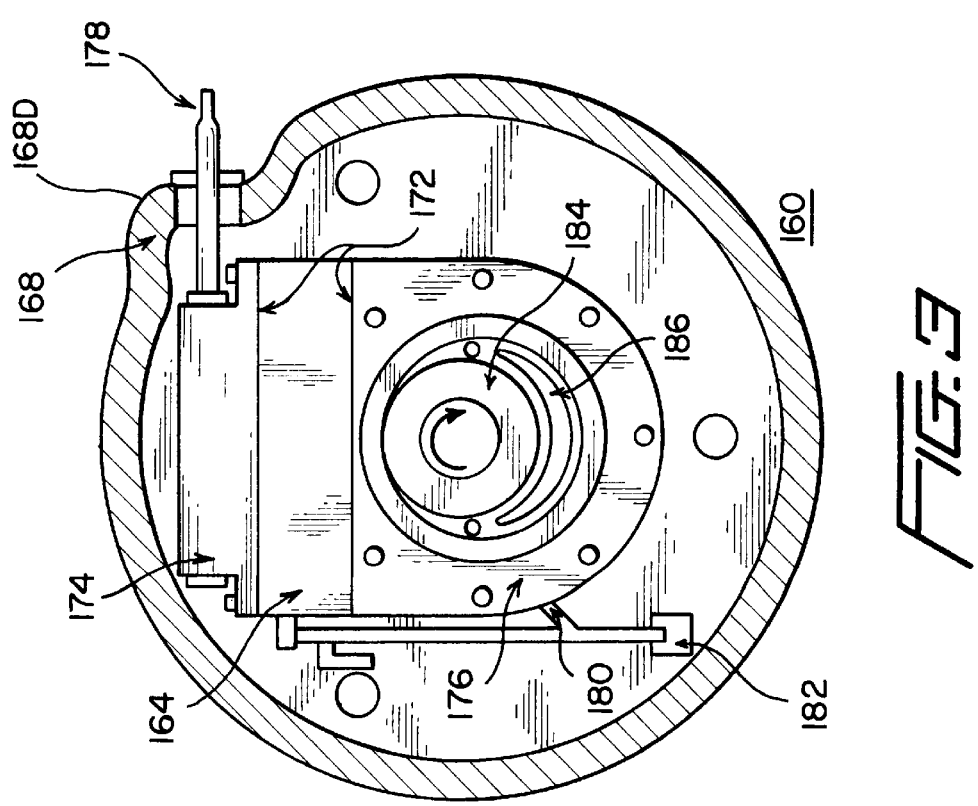

1. Pump
2. Motor
3. Relief Valve
4. 4-Way Spool Valve
5 & 6. Cross-Over Relief Valves
7. Make-up Check Valves
8. Mechanical Actuator for Spool Valve.
9. Oil Screen

VARIABLE SPEED TRANSMISSION

BACKGROUND OF THE INVENTION

The present invention relates generally to automotive and industrial power transmission where a variation in the speed supplied by a power source is required. The invention further relates to industrial brakes as it may be used to control or reduce the speed of any rotating force without friction.

Various designs of variable speed transmissions (VSTs), manual and automatic transmissions, speed reducers, clutches, brakes, and torque converters have been used to supply a desired output speed to a mechanical device, such as an output shaft used to rotate a drive axle. However, such designs use friction devices in order to vary the output speed. Friction is purposely used in order to slow the output speed.

Such designs which purposely use friction for speed reduction are wasteful of the energy supplied to the prime mover such as motor or engine. Extra gasoline or other fuel or electrical energy will be required if one is using friction for speed reduction. This drives up costs of operation and lowers the energy efficiency in any such system using the friction devices.

Often transmissions are limited to certain discrete ratios of input speed to output speed. Such discrete speed ratios prevent one from running the prime mover at its most efficient speed and simultaneously having the flexibility to adjust the speed of an output load (such as a drive axle) over a continuous range of speeds.

The following patents are noted as showing various types of transmissions:

| Inventor | U.S. Pat. No. | Issue Date |
| --- | --- | --- |
| McGarraugh | 4,867,012 | Sep. 19, 1989 |
| Bay | 5,474,504 | Dec. 12, 1995 |
| Simkins | 5,516,132 | May 14, 1996 |
| Lardy | 5,540,632 | Jul. 30, 1996 |

Although the above and other designs have been somewhat useful, they are often subject to one or more of several disadvantages.

The speed ratios between input and output may be limited to specific values.

The range of possible output speeds may be unduly limited. (In other words, even where output speed can be continuously varied, the range over which it can be varied is limited more than desirable.)

Often such devices generate excessive friction or at least a certain amount of friction generated purposefully in order to operate.

Prior designs often generate excessive noise under certain operating conditions.

Shifting between different speed ratios in prior designs often results in a jerking of the mechanism (and vehicle if used to power a vehicle).

OBJECTS AND SUMMARY OF THE INVENTION

Accordingly, it is a primary object of the present invention to provide a new and improved variable speed transmission. A more specific object of the present invention is to provide a transmission with no or minimal friction.

A further object of the present invention is to provide new and improved variable brake.

Yet another object of the present invention is to provide a transmission and braking arrangement that generates little or no noise.

Yet another object of the present invention is to provide an arrangement that allows shifting of speed in an output speed quickly and with little or no jerk.

The above and other features of the present invention which will be more readily understood when the following detailed description is considered in conjunction with the accompanying drawings are realized by a mechanical assembly for adjusting rotary speed including a first shaft. A main carrier is fixed for rotation with the first shaft, the main carrier having at least a first and second helix gears, the first and second helix gears being part of a differential. A second shaft is operably connected to allow rotation with the first shaft and to allow relative rotation between the first shaft and the second shaft. A planetary assembly includes a planetary carrier mounted to allow rotation with the second shaft, a sun gear in the planetary carrier, and at least one planetary gear meshed to the sun gear. A speed control is operably connected to the planetary assembly for controlling operation thereof. The main carrier rotates in a axial direction parallel to an axis of the first shaft, and wherein a control input at the speed control controls rotational power transfer from the first shaft to the second shaft via operation of the planetary assembly, main carrier, and differential. The first shaft is an input shaft and the second shaft is an output shaft, and the input shaft is parallel and collinear to the output shaft. The input shaft and output shaft are operably connected such that speed control may cause the output shaft to stay stationary when the sun gear turns twice the speed of the input shaft. The speed control provides control to rotate the sun gear from twice a speed of rotation of the input shaft to the same speed as the input shaft depending on the control input.

Additionally, the second shaft and the main carrier are rotatable about a common axis.

The mechanical assembly is operable as a clutch with a power input on the input shaft and power output on the output shaft. The speed control selectively allows power transfer from the input shaft to the output shaft.

Alternately, the mechanical assembly is operable as a brake upon applying a high load to the input shaft such that the output shaft slows at a rate determined by the control input.

The present invention may alternately be described as mechanical assembly for adjusting rotary speed including a first shaft. A main carrier is fixed for rotation with the first shaft, the main carrier having at least a first and second helix gears, the first and second helix gears being part of a differential. A second shaft is operably connected to allow rotation with the first shaft and to allow relative rotation between the first shaft and the second shaft. A planetary assembly includes a planetary carrier mounted to allow rotation with the second shaft, a sun gear in the planetary carrier, and at least one planetary gear meshed to the sun gear. A speed control is operably connected to the planetary assembly for controlling operation thereof. A control input at the speed control controls rotational power transfer from the first shaft to the second shaft via operation of the planetary assembly, main carrier, and differential. The speed control provides control to rotate the sun gear from twice a speed of rotation of the input shaft to the same speed as the input shaft depending on the control input.

Preferably, the speed control is a hydraulic device selected from the group consisting of: a motor, a pump, and a fluid flow control system, the hydraulic device operable to supply a control input to the planetary carrier.

The first shaft is an input shaft and the second shaft is an output shaft. The differential further further includes third and fourth helix gears. The first helix gear is connected to rotate about a first helix axis perpendicular to an axis of the input shaft. The second helix gear is meshed to the first helix gear so as to rotate about an axis of the output shaft. The second helix gear in turn causes the third helix gear to rotate about a third helix axis perpendicular to the axis of the output shaft. The third helix gear is meshed to the fourth helix gear, the fourth helix gear being fixed relative to the output shaft. The differential further includes fifth and sixth helix gears, the fifth helix gear being meshed to the first helix gear and rotatably mounted to the input shaft and operable to transfer power (i.e., transfer energy or a load as used herein) from the planetary assembly to the main carrier via the first helix gear. The sixth helix gear is fixed to the main carrier and meshed with the third helix gear, the sixth gear operable to transfer power from the second helix gear via the main carrier to the third helix gear. The differential further includes seventh and eighth helix gears. The seventh helix gear is meshed to the fourth and sixth helix gears, and the eighth helix gear is meshed to the second and fifth helix gears. The seventh and eighth helix gears operating in identical fashion respectively as the first and third helix gears.

BRIEF DESCRIPTION OF THE DRAWINGS

The above and other features of the present invention will be more readily understood when the following detailed description is considered in conjunction with the accompanying drawings wherein like characters represent like parts throughout the several views and in which:

FIG. 2 is a a cross section side view of the mechanical components of a second embodiment variable speed transmission according to the present invention;

FIG. 3 is a cross section view taken along lines 3—3 of FIG. 2;

FIG. 6 is a top view of a main carrier and related parts of the present invention;

FIG. 7 is a side view of the main carrier and related parts of the present invention;

DETAILED DESCRIPTION

Figure 1:
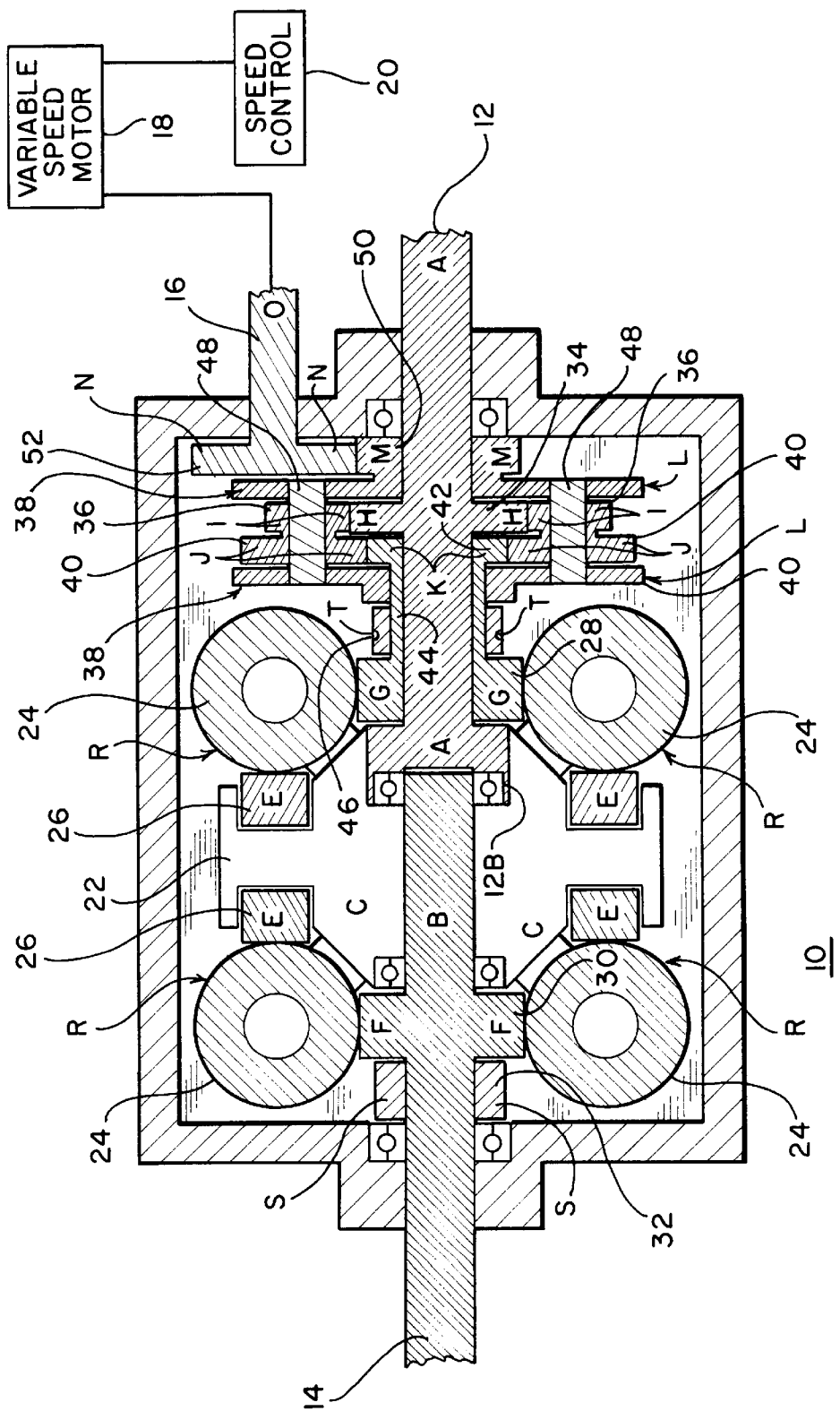
FIG. 1 is a cross section side view of the mechanical components of a first embodiment variable speed transmission according to the present invention.
Figure 5:
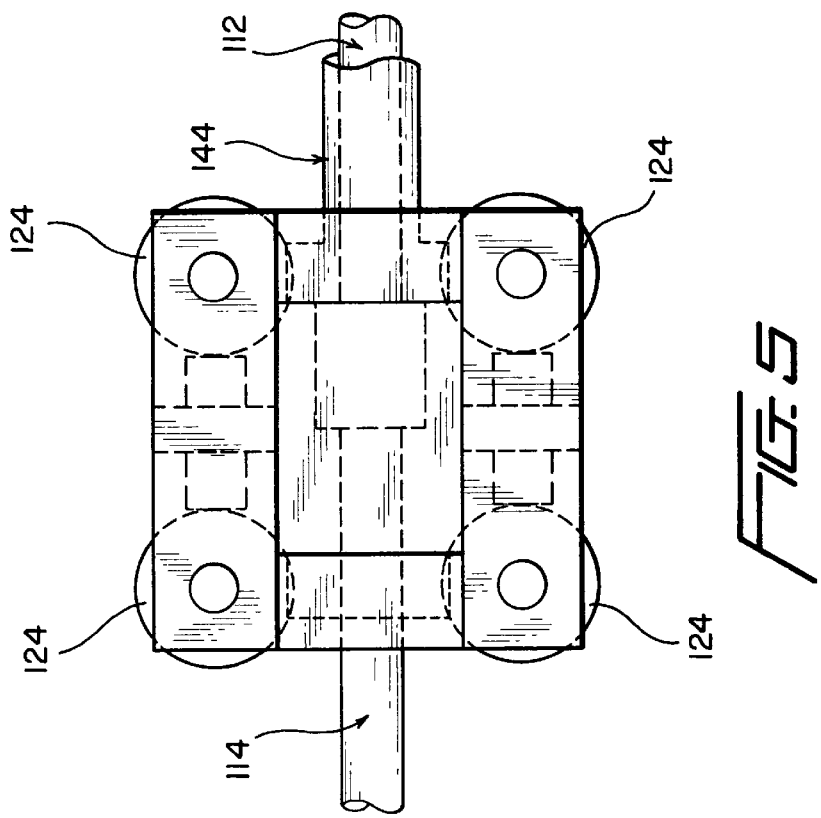
FIG. 5 is a side view of parts of the differential of the present invention.

Turning initially to FIG. 1, the mechanical assembly 10 of the present invention has an input shaft 12 to which a prime mover (not shown) such as an engine or motor may be connected. The variable speed transmission selectively controls an output shaft 14 based upon rotation of the input shaft 12 and based upon a control input applied to control shaft 16 as discussed below. The shafts 12 and 14 are coaxial and rotatably connected via bearings 12B. The output shaft 14 in turn would be connected to an output load (not shown) such as the drive axles of a vehicle.

Generally, if the control shaft 16 is stationary, the output shaft 14 will also be stationary. The input shaft 12 may rotate independently of the control shaft 16 and output shaft 14 but under whatever load (resistance) may be upon output shaft 14 even though that load may be stationary. If the input shaft 12 is held stationary, the output shaft 14 will only rotate at a speed determined by a speed control shaft 16. More generally, any input (power from motor 18 operated by speed control 20 or load, not shown) applied to the control shaft 16 determines the effective gear ratio between input shaft 12 and output shaft 14.

The input shaft 12 is rigidly connected to the main carrier 22 upon which four helix gears 24 and two helix gears 26 are mounted. Each of the helix gears has a 45 degree helix of the same hand and diameter and mounted at 90 degrees to the axis of the adjoining gear.

Helix gears 28 and 30 are identical in size to gears 24. Gear 28 meshes with the two right (i.e., in FIG. 1) gears 24, whereas gear 30 meshes with the leftmost pair of gears 24. Gear 30 is mounted rigidly to output shaft 14 and is mounted at a 90 degree axis to the two adjoining gears 24. Output shaft 14 turns freely from its contact with main carrier 22 and should be installed with bearings, not separately shown, as required. Thrust block 32 is held to main carrier 22 by bolts, not shown, thereby preventing axial movement of output shaft 14 and gear 30.

Considered together, the four gears 24 (two on the right or input side of FIG. 1 and two on the left or output side), the two gears 26 (fixed to main carrier 22), and the gears 28 and 30 act as a differential. If 30 is fixed (not allowed to turn) and carrier 22 is turned one revolution, then 28 turns two revolutions in same direction as 22. Also, if 22 is fixed and 28 is turned one revolution, then 30 would turn one revolution in the opposite direction of 28.

Now considering the load upon output shaft 14 (its resistance to turn) and power applied to the input shaft 12 and main carrier 22, then gear 28 (providing it has no resistance to turning) would turn twice that of the input at input shaft 12. Now consider that, because of the helix gears 24 and 26, very little resistance need to be applied to gear 28 to cause the other helix gears to lock and cause 30 and output shaft 14 to turn. This device provides for a "positive traction" effect.

Positive traction itself has been provided in differentials for years. However, and among other differences, the present invention turns the main carrier 22 axially rather than with a ring gear and pinion at a 90° angle to the axis. Further, the present invention provides the speed control shaft 16 as a mechanism controlling the speed of one side of the differential.

Mounted rigidly on input shaft 12 is gear 34 which is meshed with planetary gears 36 (two spaced 180 degrees on planetary carrier 38). The gears 36 are fixed rigidly to planetary gears 40. Gears 40 are meshed with gear 42 which is fixed rigidly to helix gear 28 by a hallow shaft 44 around input shaft 12. Gears 42 and 28 must turn independently of input shaft 12 and should be mounted with bearings as required. Thrust block 46 is held to the main carrier 22 by bolts (not shown) to prevent axial movement of helix gear 28.

Cage or planetary carrier 38 is mounted to turn freely of input shaft 12 and the gears 42 and 28. Cage 38 holds the planetary gears 36 and 40 by the pins 48. Gear 50 is fixed rigidly to the cage 38 and is meshed with the control gear 52 which is fixed to the control shaft 16.

The ratio between gear 34 and gear 36 is 1:2. With cage 38, gears 50 and 52 and control shaft 16 fixed and not allowed to turn, one revolution of input shaft 12 would cause planetary gears 36 and 40 to turn in place two revolutions. In turn, gears 42 and 28 turn two revolutions in the same direction as input shaft 12. Thus, with input shaft 12 and main carrier 22 turning one revolution and helix gear 28 turning two revolutions in the same direction, the output shaft 14 and helix gear 30 remain stopped and do not turn.

When the control shaft 16 is turned or allowed to turn in the opposition direction as input shaft 12, then the cage 38 turns in the same direction as 12. With cage 38 turning in the same direction as 12, the ratio between 12 and 28 is reduced from 1:2 to 1:1. Thus, if input shaft 12 turns one revolution and helix gear 28 turns one revolution in the same direction, then output shaft 14 and helix gear 30 will turn one revolution. When the ratio of 1:1 is reached, everything within the housing of the transmission turns together as one unit with the exception of the control gear 52 and control shaft 16. The helix gears 24 and 26 do not turn in place, but revolve in place with their carrier 22. The planetary gears 36 and 40 do not turn in place, but revolve in place with their carrier or cage 38 and pins 48.

Turning now to FIG. 2, an alternate embodiment mechanical assembly 110 according to the present invention will be discussed. The components of the assembly 110 will have the same last two digits as the corresponding component, if any, in assembly 10. Some components of FIG. 2 that are identical to components in FIG. 1 are not numbered to avoid repetition.

The assembly 110 operates in identical fashion as assembly 10 except as discussed below. For example, components 112, 114, 122, 124, 126, 128, 130, 132, 134, 136, 138, 140, 142, 144, and 146 operate in identical fashion to the corresponding components of FIG. 1. Note that the gear 134 is shown fixed to input shaft 112, but alternately could be fixed to thrust blocks 146.

Assembly 110 primarily differs from assembly 10 in that a hydraulic device such as reversible motor/pump 160 is used as the speed control instead of a control shaft like shaft 16 of assembly 10. Basically, the device 160 applies power (i.e., as used herein power could be a positive power or a load) to cage 138 via an internal gear 162 meshing to gear 164 fixed to cage 138. In that fashion, the device 160 applies the control input to the assembly 110 in place of using the control shaft 16 of FIG. 1.

A bell housing 166 and a bell housing 168 are shown for mounting and housing the assembly 110.

Figure 4:
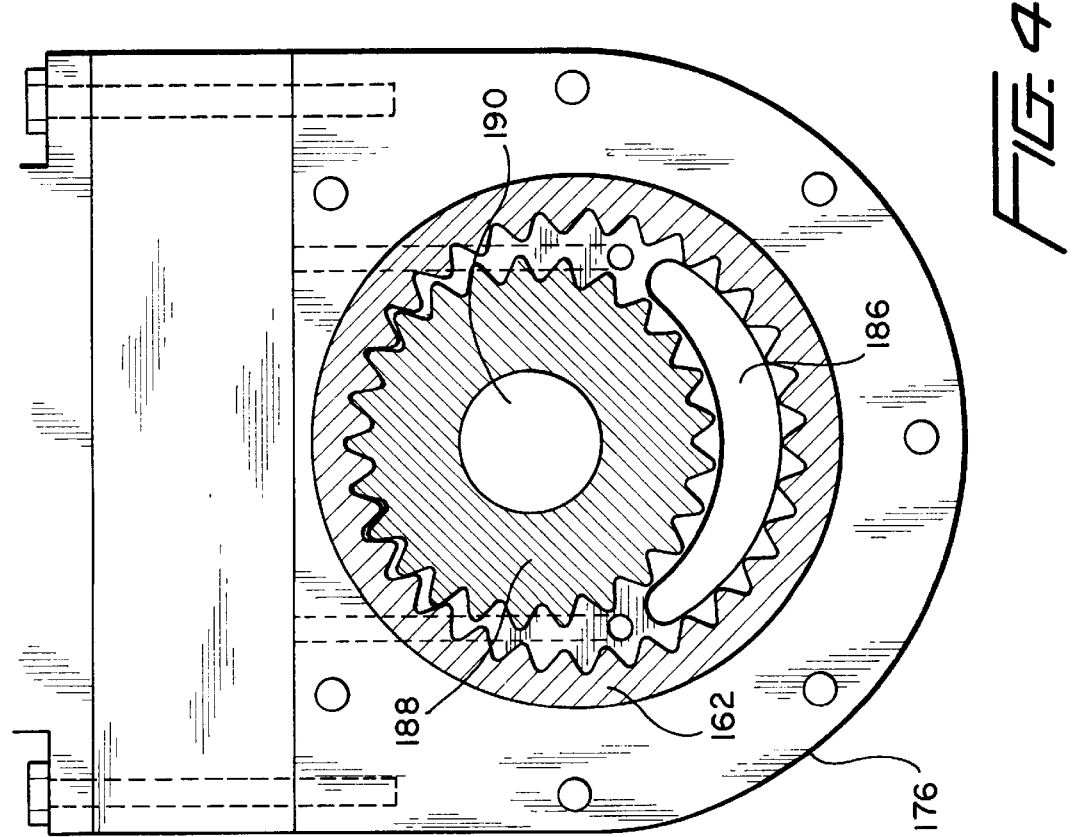
FIG. 4 is a cross section view as with FIG. 3, but showing fewer parts and the parts in more detail.
Figure 10:
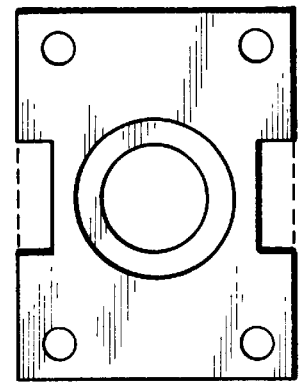
FIGS. 8–11 are respectively top, side, input end, and output end views of the main carrier.
Figure 8:
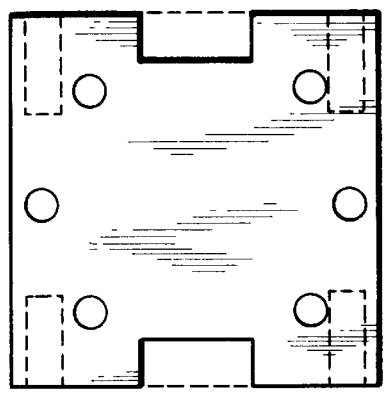
Figure 9:
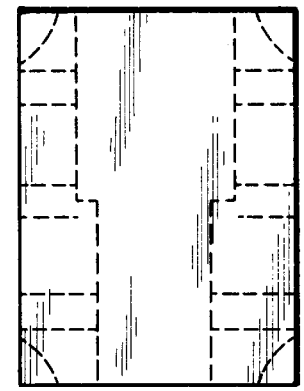
Figure 11:
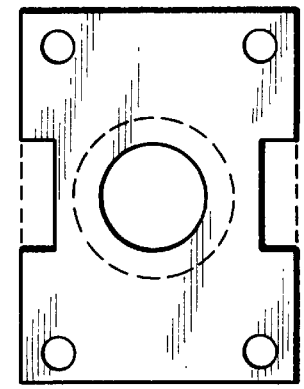

Continuing to view FIG. 2, but also viewing FIGS. 3 and 4, the device 160 will be discussed further, but it will be understood that it, by itself, operates conventionally. It is used optionally with the invention to apply a control input to the cage 138. Device 160 has a valve body 170 for relief and check valves (not shown), port match lines 172, subplate mounted four way variable flow control valve 174, housing 176, valve stem 178 at a deformed part 168D of housing 168, pump intake 180, intake screen 182, internal gear pump/motor sandwiched together 184, and abutment 186 for pump 186 (not shown is a similar abutment for the motor.

Device 160 has an external gear 188 and internal gear 162. The internal spline 190 of the pump connects to input shaft 112, whereas internal spline of the motor (not shown), connects to the cage 138.

With reference now to FIGS. 5–11, the differential realized by the eight helix gears will be discussed. Each of the four helix gears 124 is connected to the main carrier 122 by a secondary carrier 192. Construction details of the carrier 122 are shown in FIGS. 8–11.

Figure 12:
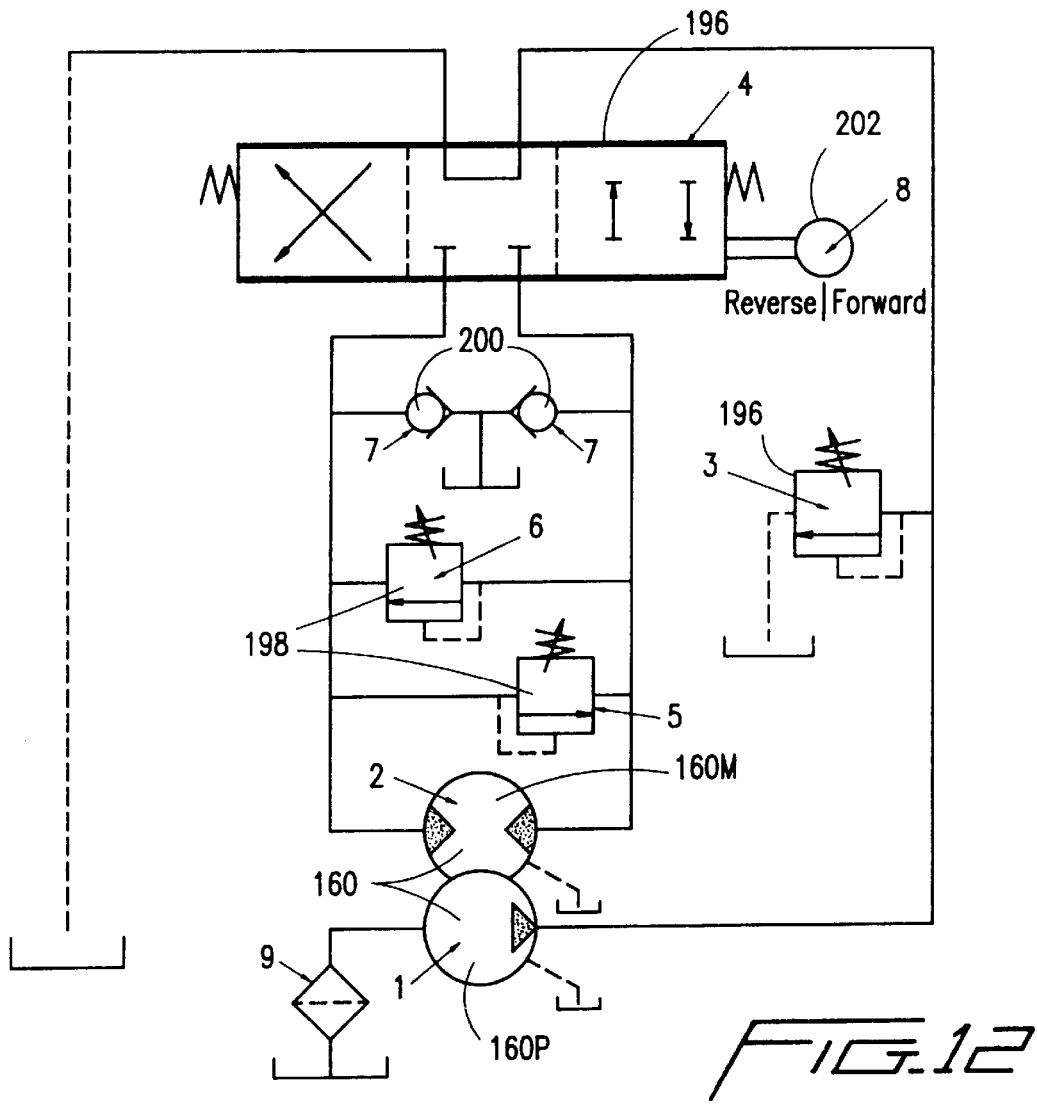
FIG. 12 is a schematic of a hydraulic arrangement.
Figure 13:
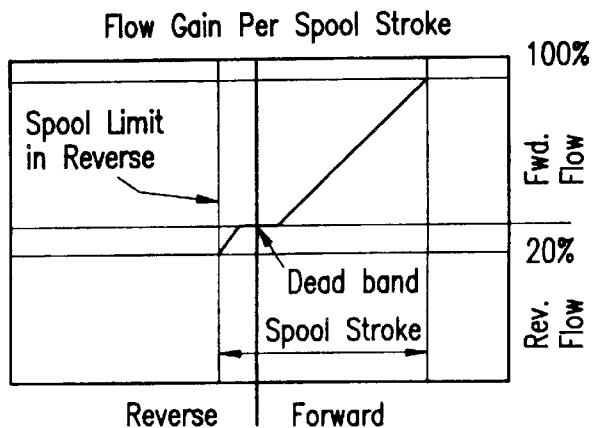
FIG. 13 is a diagram illustrating flow gain for the hydraulic arrangement of FIG. 12.

FIG. 12 shows the schematic of an arrangement for controlling the pump/motor 160 (having pump 160P and motor 160M). A relief valve 194, four way spool valve 196, cross-over relief valves 198, make-up check valves 200, mechanical actuator 202 for spool valve 196, and oil screen 204 are used. The flow gain per spool stroke is show in FIG. 13.

This device makes it possible to control rotational power from any power supply to any type of rotational load. It can, for instance, be used in place of a typical clutch which uses friction discs to relieve the shock of connecting a load to a power supply. The added benefit of this device, used as a clutch, would be the capability controlling the rotational velocity of the given load from zero to the rotational velocity of the given power supply and maintain any given velocity within this range for any length of time. It would also have the capacity of controlling the velocity in the range below zero (reverse) as long as the direction of the force of the load remains the same. It does not have the capacity for gear reduction or the ability to multiply force as a vehicle transmission can. However, such capacity (a variable ratio transmission) may emanate from this device.

This device may be used to control the deceleration of any rotational force. In this case the power supply would be disconnected and a non-rotating (rigid) device would be connected in its place. Any rotational velocity could be maintained for any length of time or may be decelerated at any chosen rate to zero velocity. For safety, a friction clutch may be connected with the non rotating device to prevent overloading the transmission.

This device may be used to connect any power supply to a rotational load.

This device would be invaluable for use as a braking device for controlling the speed of heavy trucks and similar vehicles. The vehicle speed could be held at any velocity or decelerated at any rate. As compared to conventional engine brakes, this device would have much more braking power, would be able to bring the vehicle to a complete stop and noise would much be lessened.

The rotational velocity of any power supply (which is often fixed) can be reduced to any chosen velocity and maintained indefinitely without the use of fluid drives or magnetic forces which often cause heat and power consumption.

This device could be used to control a power driven hoist. When connected with any power supply (with or without gear reduction) having a fixed rotational velocity the ascent and descent of a hoisted load can be controlled almost incrementally and held at any height. A hand crank would be connected to the speed control which is a rotating part that rotates in the same direction and speed as the output. One revolution of the hand crank would cause one revolution of the output. The power required to turn the hand crank is expected to be less than five percent of the load and since the friction in the gearing is in the same direction as the hand crank, the controlling force may come very close to zero percent.

Although specific constructions have been presented herein, it is to be understood that these are for illustrative purposes only. Various modifications and adaptations will be apparent to those of skill in the art. In view of possible modifications, it will be appreciated that the scope of the present invention should be determined by reference to the claims appended hereto.

An adaptation to note is to rearrange the existing components to have the input and output shafts at the same end of the transmission concentrically and to have the control shaft (etc.) at the opposite end.

What is claimed is:

1. A mechanical assembly for adjusting rotary speed comprising:
    a first shaft;
    a main carrier fixed for rotation with the first shaft, the main carrier supporting at least first and second helix gears, the first and second helix gears being part of a differential;
    a second shaft operably connected to the first shaft to allow rotation with the first shaft and to allow relative rotation between the first shaft and the second shaft;
    a planetary assembly including a planetary carrier mounted to allow rotation relative to the first shaft, a sun gear, and at least one planetary gear meshed to the sun gear; and
    a speed control operably connected to the planetary assembly for controlling operation thereof;
    wherein the main carrier rotates about an axial direction parallel to an axis of the first shaft, and wherein a control input at the speed control controls rotational power transfer from the first shaft to the second shaft via operation of the planetary assembly, main carrier, and differential.

2. The mechanical assembly of claim 1 wherein the first shaft is an input shaft and the second shaft is an output shaft, and the input shaft is parallel and collinear to the output shaft.

3. The mechanical assembly of claim 2 wherein the input shaft and the output shaft are operably connected such that the speed control causes the output shaft to stay stationary when the sun gear turns twice the speed of the input shaft.

4. The mechanical assembly of claim 3 wherein the speed control provides control to rotate the sun gear from twice a speed of rotation of the input shaft to the same speed as the input shaft depending on the control input.

5. The mechanical assembly of claim 1 wherein the first shaft is an input shaft and the second shaft is an output shaft, and wherein the input shaft and the output shaft are operably connected such that the speed control causes the output shaft to stay stationary when the sun gear turns twice the speed of the input shaft.

6. The mechanical assembly of claim 1 wherein the first shaft is an input shaft and the second shaft is an output shaft, and wherein the speed control provides control to rotate the sun gear from twice a speed of rotation of the input shaft to the same speed as the input shaft depending on the control input.

7. The mechanical assembly of claim 1 wherein the second shaft and the main carrier are rotatable about a common axis.

8. The mechanical assembly of claim 7 wherein the first shaft is an input shaft, the second shaft is an output shaft and the first and second shafts are rotatable about the common axis.

9. The mechanical assembly of claim 8 wherein the mechanical assembly is operable as a clutch with a power input on the input shaft and power output on the output shaft, and wherein the speed control selectively allows power transfer from the input shaft to the output shaft.

10. The mechanical assembly of claim 8 wherein the mechanical assembly is operable as a brake upon applying a high load to the input shaft such that the output shaft slows at a rate determined by the control input.

11. The mechanical assembly of claim 1 wherein the first shaft is an input shaft, the second shaft is an output shaft, and wherein the mechanical assembly is operable as a brake upon applying a high load to the input shaft such that the output shaft slows at a rate determined by the control input.

12. The mechanical assembly of claim 1 wherein the first shaft is an input shaft, the second shaft is an output shaft, and wherein the speed control selectively allows power transfer from the input shaft to the output shaft.

13. A mechanical assembly for adjusting rotary speed comprising:
    a first shaft;
    a main carrier fixed for rotation with the first shaft, the main carrier supporting at least first and second helix gears, the first and second helix gears being part of a differential;
    a second shaft operably connected to the first shaft to allow rotation with the first shaft and to allow relative rotation between the first shaft and the second shaft;
    a planetary assembly including a planetary carrier mounted to allow rotation relative to the first shaft, a sun gear, and at least one planetary gear meshed to the sun gear; and
    a speed control operably connected to the planetary assembly for controlling operation thereof;
    wherein a control input at the speed control controls rotational power transfer from the first shaft to the second shaft via operation of the planetary assembly, main carrier, and differential, and wherein the speed control provides control to rotate the sun gear from twice a speed of rotation of the input shaft to the same speed as the input shaft depending on the control input.

14. The mechanical assembly of claim 13 wherein the speed control is a hydraulic device selected from the group consisting of: a motor, a pump, and a fluid flow control system, the hydraulic device operable to supply the control input to the planetary carrier.

15. The mechanical assembly of claim 13 wherein the first shaft is an input shaft and the second shaft is an output shaft, and wherein the differential further includes third and fourth helix gears.

16. The mechanical assembly of claim 15 wherein the first helix gear is connected to rotate about a first helix axis perpendicular to an axis of the input shaft, the second helix gear being meshed to the first helix gear so as to rotate about an axis of the output shaft, the second helix gear in turn causing the third helix gear to rotate about a third helix axis perpendicular to the axis of the output shaft, the third helix gear being meshed to the fourth helix gear, the fourth helix gear being fixed relative to the output shaft.

17. The mechanical assembly of claim 16 wherein the differential further includes fifth and sixth helix gears, the fifth helix gear being meshed to the first helix gear and rotatably mounted to the input shaft and operable to transfer power from the planetary assembly to the main carrier via the first helix gear, and the sixth helix gear is fixed to the main carrier and meshed with the third helix gear, the sixth helix gear operable to transfer power from the second helix gear via the main carrier to the third helix gear.

18. The mechanical assembly of claim 17 wherein the differential further includes seventh and eighth helix gears, and wherein the seventh helix gear is meshed to the fourth and sixth helix gears, and wherein the eighth helix gear is meshed to the second and fifth helix gears; the seventh and eighth helix gears operating in identical fashion respectively as the first and third helix gears.

19. The mechanical assembly of claim 13 wherein the first shaft is an input shaft, the second shaft is an output shaft, and wherein the mechanical assembly is operable as a brake upon applying a high load to the input shaft such that the output shaft slows at a rate determined by the control input.

20. The mechanical assembly of claim 19 wherein the first shaft is an input shaft, the second shaft is an output shaft, and wherein the speed control selectively allows power transfer from the input shaft to the output shaft.

* * * * *